May 6, 1941.    J. Q. A. HOLLOWAY    2,241,131
SOUND REPRODUCING APPARATUS
Filed Dec. 9, 1938    2 Sheets-Sheet 1
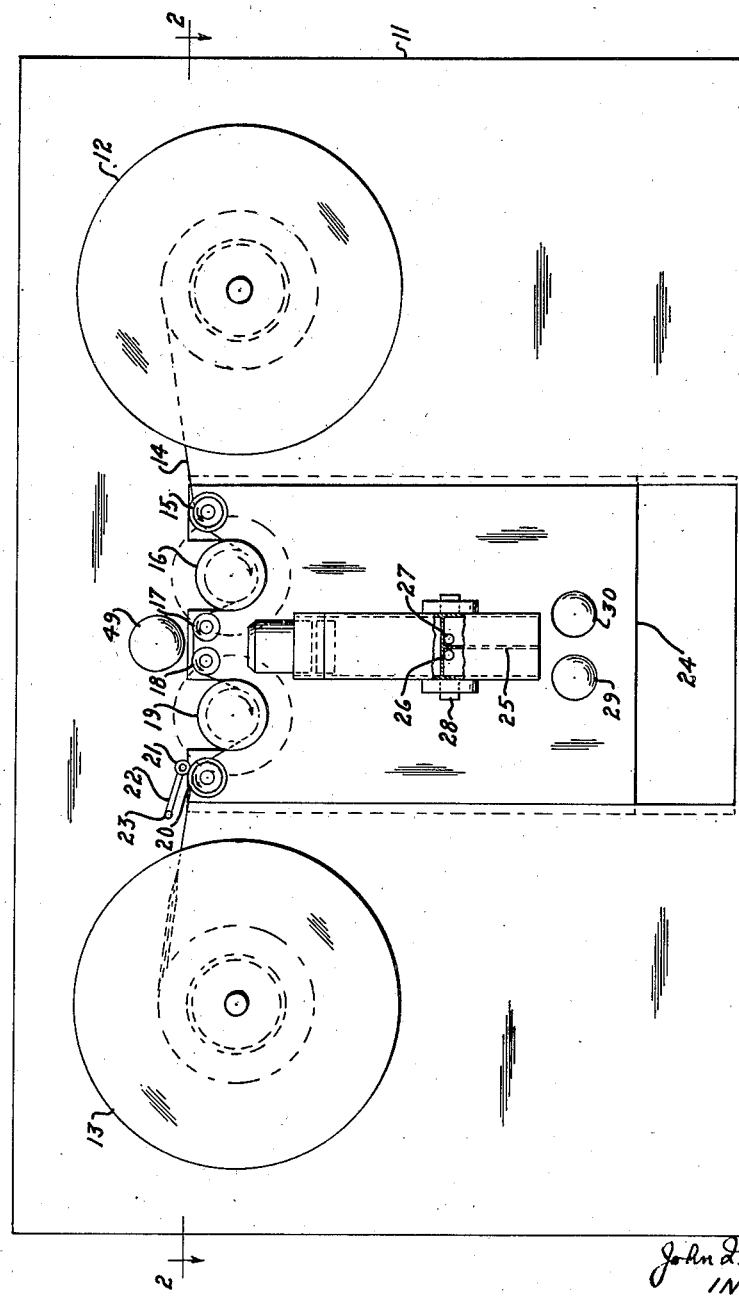
John Q. A. Holloway
INVENTOR May 6, 1941.  J. Q. A. HOLLOWAY  2,241,131
SOUND REPRODUCING APPARATUS
Filed Dec. 9, 1938  2 Sheets-Sheet 2
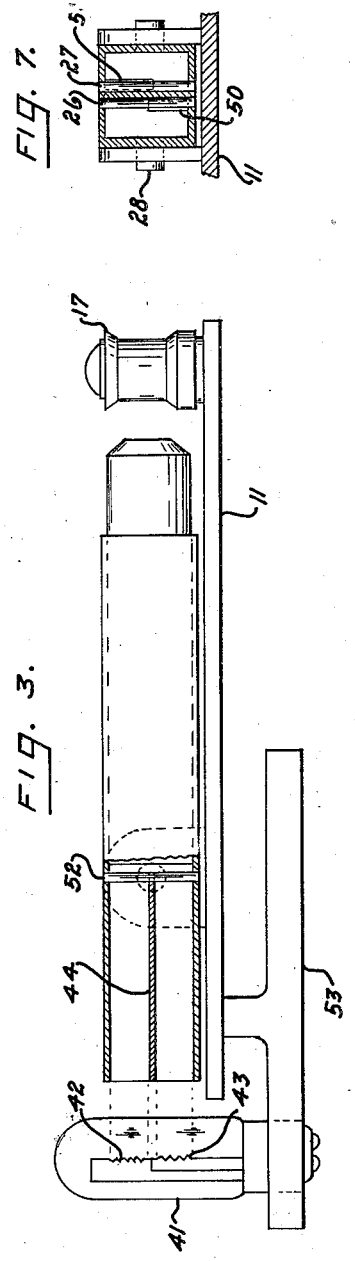
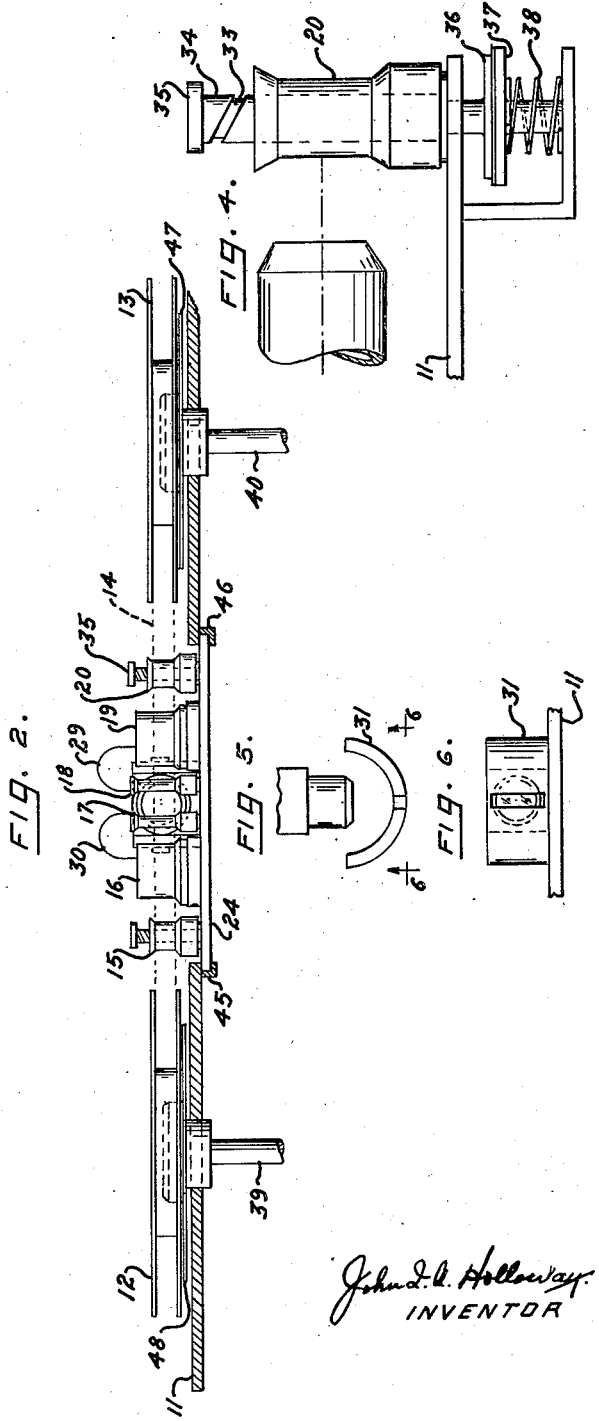
John Q. A. Holloway
INVENTOR Patented May 6, 1941

2,241,131

UNITED STATES PATENT OFFICE 2,241,131

SOUND REPRODUCING APPARATUS

John Q. A. Holloway, New York, N. Y.

Application December 9, 1938, Serial No. 244,736

6 Claims. (Cl. 179—100.3)

This invention relates to sound reproducing machines and has particular reference to that class of machines in which the sound is recorded on a strip of film and is reproduced by means of a light sensitive device such as a photoelectric cell.

An important object of this invention is to provide means for utilizing several sound tracks in predetermined succession on one strip of film.

Further objects and advantages of the invention will become apparent from the following description when taken in connection with the accompanying drawings, in which Figure 1 is a top view embodying the present invention;

Figure 2 is a fragmental sectional view taken on line 2—2 of Figure 1;

Figure 3 is an alternative light source;

Figure 4 is an enlarged fragmental view of one of the film roller guides;

Figure 5 is an enlarged fragmental view of an alternate means for fixing the film track at the proper distance from the light source and the light sensitive cell;

Figure 6 is a vertical view corresponding to Figure 5 and taken on line 6—6 of Figure 5; and Figure 7 is an enlarged fragmental and sectional view of a portion of the light source.

The sound reproducing machine embodying the instant invention is herein disclosed as including a face plate 11, having an opening in the central portion thereof, and angles 45 and 46 fastened to said face plate at either side of the opening and on the lower surface of the plate. The light and threading mechanisms are mounted to auxiliary plate 24 which is arranged and dimensioned to fit between and mount movably in angles 45 and 46.

The light mechanism consists of an optical system similar to that disclosed in United States Letters Patent No. 1,983,697 issued to me on December 11, 1934 except that the optical system herein is arranged to utilize more than one beam of light. The rear opening of the lens barrel is partitioned by element 25 dividing the barrel horizontally into two portions. Cylindrical lenses 26 and 27 act to gather the light from lamps 29 and 30 respectively and to focus, in combination with the balance of the optical system, a narrow beam of light upon the film 14. As shown, in Figure 1 a vertical partition at right angles to partition 25 serves to block off all light except such as passes through apertures 50 and 51 (see Figure 7). Of course, the light passing through the upper aperture 51 will emerge as a low beam of light on the film. Correspondingly, the light passing through the lower aperture 50 will emerge as a high beam of light on the film. The vertical spacial difference between the two beams of light on the film will depend upon the characteristics of the optical system and can be predetermined and controlled by principles commonly known in the art. In the present invention this space effect is utilized to select either one of two sound tracks on the film by energizing either lamp 29 or 30 as desired.

The whole optical system is rotatably mounted on shaft 28 and is arranged by any ordinary means to be locked in either one of two positions in a vertical plane. In such manner, it is possible to utilize four different sound tracks as desired. The combinations of lights and optical system position required for selection of any particular sound track are as follows:

| Track | Optical system position | Lamp energized |
|---|---|---|
| Top | Up | 29 |
| Upper center | do | 30 |
| Lower center | Down | 29 |
| Bottom | do | 30 |

Figure 3 illustrates an alternate means for obtaining an upper and lower beam of light. Only one lamp, element 41, is used. This lamp has two filaments, upper filament 42 and lower filament 43. If the upper filament is energized the light is restricted to the upper compartment of the optical system by horizontal partition 44 and the resultant beam is a low light beam on the film. Conversely filament 43 will furnish a high beam. In this system only one cylindrical lens, element 52, need be used.

As shown in Figure 1, the film has been threaded through rollers 15, 16, 17, 18, 19 and 20 from reel 12 to take up reel 13, the reels being mounted on drive discs 48 and 47 respectively. Rollers 15, 17, 18 and 20 are idlers. Rollers 16 and 19 may both be friction type drive rollers or one may be an idler and the other a drive roller. The machine will operate satisfactorily either way. Rollers 15 and 20 serve as guide rollers and are arranged on the Bendix principle to move up or down and remain in such position depending upon the direction of film travel. Figure 4 illustrates the method of construction and operation of roller 20. This roller is mounted rotatably and movably on shaft 34 which is capped on its upper end by 35 and which extends through face plate 11 and is capped on its other end by friction plate 36. The shaft is threaded as at 33 throughout its length above face plate 11 and is fastened to said face plate by any suitable means so that it may only rotate therein. Friction plate 37 is held firmly against plate 36 by means of spring 38. The friction is adjusted so that it is somewhat less than the friction of the film on the roller. Roller 20 is threaded on the inside to fit thread 33. As an alternative a pin may be driven into roller 20, protruding through to thread 33. If we assume that the film is causing roller 20 to rotate so that its front face (face being viewed in Figure 4) is travelling left to right the tendency will be for roller 20 to run down thread 33 and it will, therefore, occupy the position shown. If the rotation is reversed the clutch 36—37 will hold shaft 34 and roller 20 will run up thread 33 until it is adjacent to cap 35. It will stop there and drive the shaft with it in the direction of its own rotation against the action of clutch 36—37. This change in position moves the film strip upward.

The Bendix action described above permits the film to carry double the number of sound tracks and if combined with the means heretofore described, permits utilization of eight such tracks on one strip. The combinations of lights, optical system position and Bendix roller position required for selection of any particular sound track are as follows:

| Sound track top to bottom | Optical system position | Lamp energized | Bendix roller |
| --- | --- | --- | --- |
| 1 | Up | 29 | Up. |
| 2 | do | 30 | Do. |
| 3 | Down | 29 | Do. |
| 4 | do | 30 | Do. |
| 5 | Up | 29 | Down. |
| 6 | do | 30 | Do. |
| 7 | Down | 29 | Do. |
| 8 | do | 30 | Do. |

The means for controlling the optical system position, the lamp energized and the direction of film travel may be any ordinary mechanical or electrical means commonly used to effectuate such results. One means for reversing the film travel is illustrated. Roller 21 is adjusted so that film 14 rolling on 20 ordinarily clears roller 21. If, however, a thick strip is rigidly attached to the end of the film, it will exert pressure on roller 21 as it passes by. This pressure is transmitted through lever 22 and pivot 23 to a contact system (not shown) which acts to reverse the film.

As shown in Figures 1 and 2 the light beam is transmitted to the film through the space between rollers 17 and 18 to light sensitive cell 49. Rollers 17 and 18 could be replaced by guide 31 with an aperture in the central portion thereof (see Figures 5 and 6).

It will be understood that the invention is not limited to the particular embodiments shown and described. For instance, it would be possible to utilize more than two light beams at different heights or the optical system could be arranged to be positioned at more than two points in a vertical plane. These and other modifications would merely be alternate means of accomplishing the objects and purposes of this invention as described in and limited only by the annexed claims.

I claim:

1. In a sound reproducing machine of the type described, a film guide roller, a face plate, said roller mounted upon said face plate, and said roller comprising a main roller free to rotate about a central shaft, a cap upon the free end of said shaft, said shaft being longer than said main roller and means for movement of said main roller along the axis of said shaft as said roller is caused to rotate about said shaft.

2. In a sound reproducing machine of the type described, an optical system similar to that disclosed in United States Letters Patent Number 1,983,697, means to set such optical system at predetermined points in a plane, and a film guide roller mounted upon a face plate, said guide roller comprising a main roller free to rotate about a central shaft, a cap upon the free end of said shaft, said shaft being longer than said main roller and means for movement of said main roller along the axis of said shaft as said roller is caused to rotate about said shaft.

3. In a sound reproducing machine of the type described, an optical system similar to that disclosed in United States Letters Patent Number 1,983,697, said optical system comprising means for producing a predetermined number of light beams at predetermined levels, and a film guide roller mounted upon a face plate, said guide roller comprising a main roller free to rotate about a central shaft, a cap upon the free end of said shaft, said shaft being longer than said main roller and means for movement of said main roller along the axis of said shaft as said roller is caused to rotate about said shaft.

4. In a sound on film reproducing machine of the type described, the combination with a multiple light source of a transparent light-refracting cylinder of circular cross-section disposed to receive rays of light emitted from said source and focus them into a narrow elongated zone of illumination, optical lens means for producing, from the aforesaid narrow elongated zone of illumination, a sharply defined image of minute width on the film, and means to set such image at different points along the width of said film.

5. In a sound on film reproducing machine of the type described, the combination with a multiple light source, each such source arranged at different elevation, a transparent light-refracting cylinder of circular cross-section disposed to receive rays of light emitted from said sources and focus them into narrow elongated zones of illumination, and optical lens means for producing, from the aforesaid narrow elongated zones of illumination, sharply defined images of minute width on the film.

6. In a sound on film reproducing machine of the type described, the combination with a multiple light source, each such source arranged at different elevation, a transparent light-refracting cylinder of circular cross-section disposed to receive rays of light emitted from said sources and focus them into narrow elongated zones of illumination, optical lens means for producing, from the aforesaid narrow elongated zones of illumination, sharply defined images of minute width on the film, and means to set such images at different points along the width of said film.

JOHN Q. A. HOLLOWAY.